(12) United States Patent
Yamano et al.

(10) Patent No.: US 9,772,249 B2
(45) Date of Patent: Sep. 26, 2017

(54) SENSOR DEVICE, MOTOR CONTROL DEVICE, AND ELECTRIC POWER STEERING APPARATUS

(71) Applicants: JTEKT CORPORATION, Osaka-shi, Osaka (JP); DENSO CORPORATION, Kariya-shi, Aichi-ken (JP)

(72) Inventors: Naoki Yamano, Okazaki (JP); Yuko Onoda, Okazaki (JP); Satoru Mikamo, Okazaki (JP); Akira Yamamoto, Takahama (JP); Hideki Kabune, Nagoya (JP)

(73) Assignees: JTEKT CORPORATION, Osaka (JP); DENSO CORPORATION, Kariya (JP)

( * ) Notice: Subject to any disclaimer, the term of this patent is extended or adjusted under 35 U.S.C. 154(b) by 40 days.

(21) Appl. No.: 14/449,992

(22) Filed: Aug. 1, 2014

(65) Prior Publication Data
US 2015/0046039 A1    Feb. 12, 2015

(30) Foreign Application Priority Data
Aug. 8, 2013 (JP) .................................. 2013-165239

(51) Int. Cl.
*G01L 25/00* (2006.01)
*B62D 6/10* (2006.01)
(Continued)

(52) U.S. Cl.
CPC ............ *G01L 25/003* (2013.01); *B62D 5/049* (2013.01); *B62D 5/0463* (2013.01);
(Continued)

(58) Field of Classification Search
None
See application file for complete search history.

(56) References Cited

U.S. PATENT DOCUMENTS 9,359,006 B2 *   6/2016   Kodera ............... B62D 5/0472
9,399,485 B2 *   7/2016   Kodera ............... B62D 5/0463
(Continued)

FOREIGN PATENT DOCUMENTS

DE      102011017223 A1    11/2011
EP          1288105 A2      3/2003
(Continued)

OTHER PUBLICATIONS

Jun. 1, 2015 European Search Report issued in European Patent Application No. 14179843.9.
(Continued)

*Primary Examiner* — Rami Khatib
*Assistant Examiner* — Jeffrey Boomer
(74) *Attorney, Agent, or Firm* — Oliff PLC (57) ABSTRACT

A sensor device, such as a torque sensor, of a motor control device or an electric power steering apparatus includes a sensor section that detects a quantity of state of a detection subject and outputs a detection signal corresponding to the detected quantity of state. When receiving a specific trigger transmitted from an external device, the sensor section outputs an abnormality diagnosis signal, which is configured by a predetermined waveform and used for determining whether there is an output abnormality of the sensor section, and then outputs the detection signal.

8 Claims, 8 Drawing Sheets

(51) Int. Cl.
*B62D 5/04* (2006.01)
*G01L 5/22* (2006.01)
*H02K 11/24* (2016.01)

(52) U.S. Cl.
CPC ............. *B62D 5/0481* (2013.01); *B62D 6/10* (2013.01); *G01L 5/221* (2013.01); *H02K 11/24* (2016.01)

(56) References Cited

U.S. PATENT DOCUMENTS

| | | | |
|---|---|---|---|
| 2003/0040872 A1 | 2/2003 | Ueno | |
| 2007/0067078 A1* | 3/2007 | Salman | G01R 31/2846 701/30.2 |
| 2007/0205734 A1 | 9/2007 | Miyazawa et al. | |
| 2009/0295559 A1* | 12/2009 | Howell | B60Q 11/00 340/459 |
| 2011/0232988 A1* | 9/2011 | Aoki | G01L 25/003 180/446 |
| 2012/0006612 A1 | 1/2012 | Wilson-Jones et al. | |
| 2012/0031202 A1 | 2/2012 | Goto et al. | |
| 2013/0264915 A1 | 10/2013 | Suzuki et al. | |
| 2014/0102219 A1* | 4/2014 | Kuwahara | B62D 5/049 73/862.333 |
| 2014/0360803 A1* | 12/2014 | Hori | B62D 5/049 180/446 |
| 2015/0109020 A1* | 4/2015 | Morino | G01R 19/0092 324/764.01 |
| 2015/0166101 A1* | 6/2015 | Ross | B62D 5/0472 701/41 |
| 2015/0226627 A1* | 8/2015 | Kuwahara | B62D 5/049 701/41 |
| 2015/0353079 A1* | 12/2015 | Suzuki | B60T 8/1755 701/43 |

FOREIGN PATENT DOCUMENTS

| | | |
|---|---|---|
| EP | 1826097 A1 | 8/2007 |
| EP | 2420810 A1 | 2/2012 |
| JP | S63282600 A | 11/1988 |
| JP | 2001-004653 A | 1/2001 |
| JP | A-2005-300267 | 10/2005 |
| JP | 2012-137457 A | 7/2012 |
| WO | 98/15809 A1 | 4/1998 |

OTHER PUBLICATIONS

May 9, 2017 Office Action issued in Japanese Patent Application No. 2013-165239.

* cited by examiner

SENSOR DEVICE, MOTOR CONTROL DEVICE, AND ELECTRIC POWER STEERING APPARATUS

CROSS-REFERENCE TO RELATED APPLICATIONS

This application is based on and claims priority from Japanese Patent Application No. 2013-165239, filed on Aug. 8, 2013, the entire contents of which are incorporated herein by reference.

BACKGROUND OF THE INVENTION

The present invention relates to a sensor device for outputting a detection signal corresponding to a quantity of state of a detection subject, a motor control device using the sensor device, and an electric power steering apparatus using the motor control device.

An electric power steering apparatus, which assists in steering operation by the driver by applying assist torque from a motor to the steering mechanism of a vehicle, is known. The electric power steering apparatus includes a torque sensor for detecting steering torque applied by the driver to the steering mechanism and a motor control device for controlling the driving of a motor. The torque sensor includes a sensor section for detecting changes in the steering torque and outputs a detection signal corresponding to the steering torque detected by the sensor section to the motor control-device. The motor control device obtains a steering torque value based on the detection signal from the torque sensor and sets an assist command value based on the obtained torque value. The motor control device controls the driving of the motor such that the assist torque of the motor follows the assist command value.

However, if an abnormality occurs in the sensor section of the electric power steering apparatus, the electric power steering apparatus cannot detect the steering torque. This hampers control of the driving of the motor by the electric power steering apparatus. To solve this problem, as described in Japanese Laid-open Patent Publication No. 2005-300267, a conventional electric power steering apparatus has a torque sensor configured as a dual system (in accordance with redundant design) including two sensor sections. In this configuration, even if an abnormality occurs in one of the two sensor sections, the motor control device is able to continuously control the driving of the motor using the other sensor section, which operates normally.

SUMMARY OF THE INVENTION

When a torque sensor has sensor sections provided as a dual system, the motor control device detects an abnormality in each sensor section by comparing detection signals output from the sensor sections. However, when an abnormality occurs in one of the two sensor sections and only one of the sensor sections operates normally, the above-described abnormality detecting method cannot detect an abnormality in the remaining sensor section.

This problem occurs in not only torque sensors employed in electric power steering apparatuses but are common in various types of sensor devices that detect a quantity of state of a detection subject.

Accordingly, it is an objective of the present invention to provide a sensor device, a motor control device, and an electric power steering apparatus capable of detecting an output abnormality of a sensor section even when the sensor section is the only sensor section capable of detecting a quantity of state of a detection subject.

To achieve the foregoing objective and in accordance with one aspect of the present invention, a sensor device including a sensor section is provided. The sensor section detects a quantity of state of a detection subject and outputs a detection signal corresponding to the detected quantity of state. When receiving a specific trigger transmitted from an external device, the sensor section outputs an abnormality diagnosis signal, which is configured by a predetermined waveform and used for determining whether there is an output abnormality of the sensor section, and then outputs the detection signal.

In this configuration, by checking whether the abnormality diagnosis signal output from the sensor section in response to the specific trigger from the external device has the predetermined waveform, an output abnormality of the sensor section is detected. By the abnormality detection method, an output abnormality of the sensor section is detectable even when only one sensor section is capable of detecting the quantity of state of the detection subject.

In the above described sensor device, the abnormality diagnosis signal preferably includes at least one of a waveform in which output at a level corresponding to a lower limit value of the detection signal continues for a predetermined time and a waveform in which output at a level corresponding to an upper limit value of the detection signal continues for a predetermined time.

In this configuration, an abnormality such as an offset detection signal or a detection signal having a changing gain is easily detected.

In the above described sensor device, the sensor section preferably outputs an abnormality detection signal when detecting an abnormality through self-diagnosis, and the abnormality diagnosis signal preferably includes a waveform in which output at a level corresponding to the abnormality detection signal continues for a predetermined time.

In this configuration, an abnormality in the abnormality diagnosis function of the sensor section is easily detected.

In the above described sensor device, the trigger is preferably start of electric power supply to the sensor section.

In this configuration, the sensor section is allowed to output the abnormality diagnosis signal without arranging an additional signal line for obtaining a trigger from an external device in the sensor section. This easily provides the sensor section for outputting the abnormality diagnosis signal.

In the above described sensor device, the trigger is preferably input of a specific command signal to the sensor section.

In this configuration, the sensor section is allowed to output the abnormality diagnosis signal by transmitting the specific command signal from the external device to the sensor section. The configuration also easily provides the sensor section for outputting the abnormality diagnosis signal.

In accordance with another aspect of the present invention, a motor control device is provided that includes the above described sensor device and a control section for controlling the driving of a motor based on the detection signal output from the sensor section of the sensor device. The control section causes the sensor section to alternately output the abnormality diagnosis signal and the detection signal by periodically transmitting the trigger to the sensor section. The control section determines whether there is an output abnormality of the sensor section based on the abnormality diagnosis signal. The control section updates a hold value using a quantity of state obtained based on the detection signal each time the sensor section outputs the detection signal. The control section controls the driving of the motor based on the updated hold value in a period during which the sensor section outputs the abnormality diagnosis signal.

In this configuration, when the sensor section outputs the abnormality diagnosis signal, an output abnormality of the sensor section is detected based on the abnormality diagnosis signal. Also, while the sensor section outputs the abnormality diagnosis signal, the driving of the motor is continuously controlled based on the hold value. That is, an abnormality of the sensor section is detected while the driving of the motor is continuously controlled.

If the control section detects an output abnormality of the sensor section based, on the abnormality diagnosis signal and the detected output abnormality is an abnormality of the detection signal, the detection signal of the sensor section may have been an abnormal value since before the detection of the abnormality. That is, the detection signal of the sensor section may have been an abnormal value that is widely different from the actual quantity of state of the detection subject at the point in time at which the quantity of state used as the hold value was obtained. The current hold value thus may be an abnormal value. In this case, the control section continuously controls the driving of the motor using the abnormal hold value after the hold value is updated, which is undesirable.

To solve this problem, in the above described sensor device, when detecting an output abnormality of the sensor section based on the abnormality diagnosis signal output from the sensor section immediately after update of the hold value, the control section preferably returns the hold value to the value before the update.

In this configuration, when detecting an abnormality of the detection signal as an output abnormality of the sensor section, the control section returns the hold value to the value before the update. The control section thus cannot control the driving of the motor continuously using the abnormal hold value. As a result, continuous inappropriate driving of the motor is avoided.

Also, in the motor control device, if an abnormality occurs in the sensor section when the quantity of state used as the hold value is detected, the quantity of state used as the hold value becomes an abnormal value widely different from the actual quantity of state of the detection subject. At this stage, if the abnormality of the sensor section is a short-time abnormality such as instantaneous interruption, the abnormality is difficult to detect. When the abnormality of the sensor section is undetectable, the control section may continuously control the driving of the motor based on the abnormal hold value.

To solve this problem, in the above described sensor device, the control section preferably returns the hold value to the value before the update if a signal output from the sensor section immediately after the control section obtains the quantity of state used as the hold value continues to be at a level lower than or equal to a predetermined threshold value for a predetermined time.

In this configuration, if an abnormality such as instantaneous interruption occurs in the sensor section immediately after the quantity of state used as the hold value is obtained and the signal output from the sensor section continues to be at a level lower than or equal to the predetermined threshold value for the predetermined time period, the control section returns the hold value to the value before the update. The control section thus does not continuously control the driving of the motor using the abnormal hold value. As a result, continuous inappropriate driving of the sector is avoided.

In the above described sensor device, the control section preferably detects the quantity of state used as the hold value on condition that the output abnormality of the sensor section is not detected in a period from a point in time at which it is detected that the sensor section outputs the detection signal to a point in time at which a predetermined time has elapsed.

In this configuration, an appropriate quantity of state that corresponds to the actual quantity of state of the detection subject is used as the hold value. This ensures appropriate driving of the motor.

In accordance with still another aspect of the present invention, an electric power steering apparatus is provided that includes a motor for applying assist torque to a steering mechanism of a vehicle; and the above described motor control device for controlling driving of the motor. The sensor device of the motor control device is a torque sensor that detects steering torque applied to the steering mechanism.

In this configuration, an abnormality occurring in the torque sensor is detectable.

Otter aspects and advantages of the invention will become apparent from the following description, taken in conjunction with, the accompanying drawings, illustrating by way of example the principles of the invention.

DETAILED DESCRIPTION OF THE PREFERRED EMBODIMENTS

First Embodiment

A sensor device according to a first embodiment of the present invention will now be described. A motor control device and an electric power steering apparatus that employ the sensor device will also be described.

Figure 1:
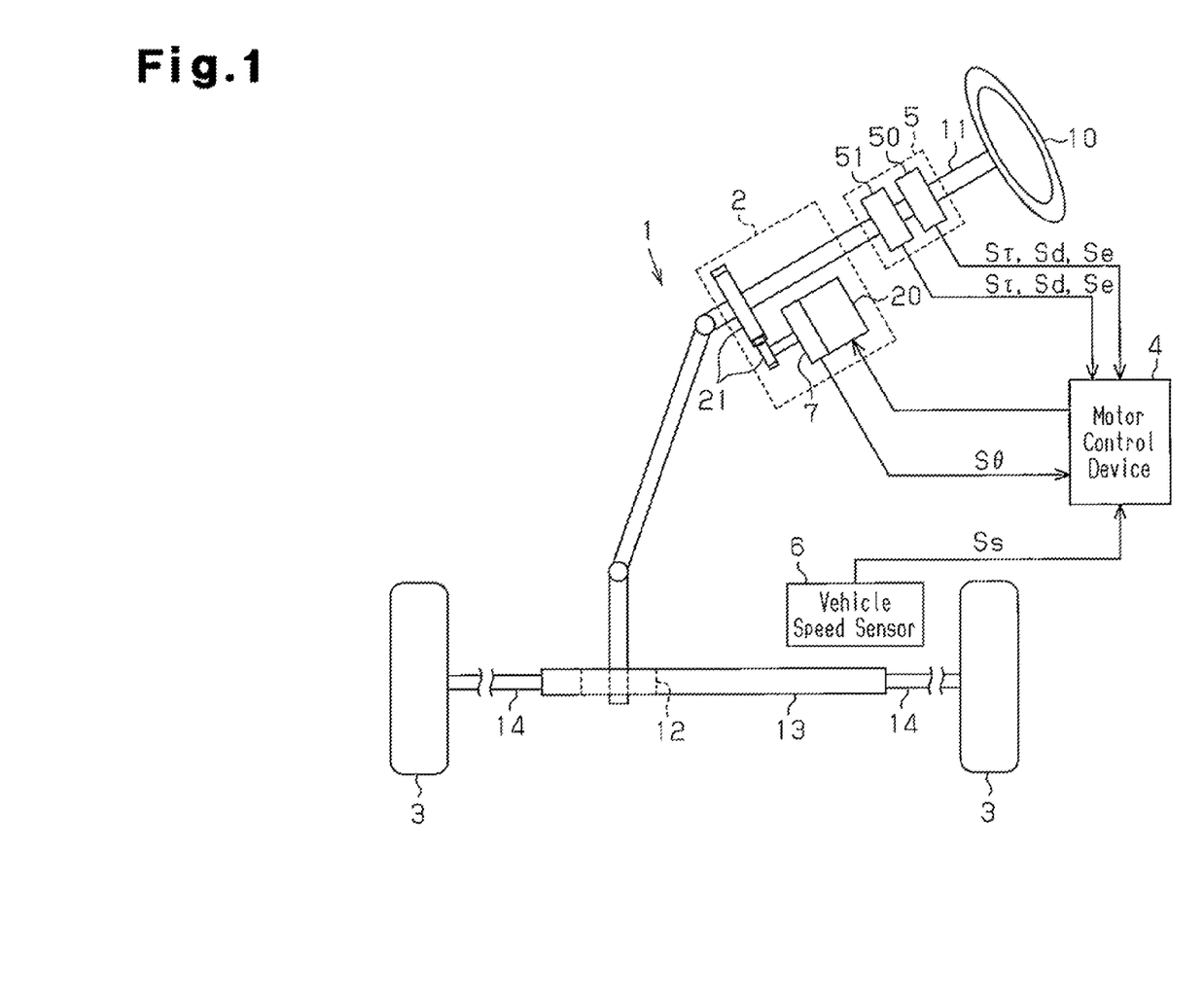
FIG. 1 is a block diagram representing the schematic configuration of an electric power steering apparatus according to a first embodiment of the present invention.

As shown in FIG. 1, the electric power steering apparatus has a steering mechanism 1 for steering steerable wheels 3 based on manipulation of a steering wheel 10 by the driver and an assist mechanism 2 for assisting in steering operation by the driver.

The steering mechanism 1 has a steering shaft 11, which is a rotary shaft of the steering wheel 10, and a rack shaft 13 connected to a lower end portion of the steering shaft 11 through a rack-and-pinion mechanism 12. In the steering mechanism 1, when the steering wheel 10 is manipulated by the driver to rotate the steering shaft 11, rotation of the steering shaft 11 is converted into axial linear reciprocation of the rack shaft 13 through the rack-and-pinion mechanism 12. The linear reciprocation of the rack shaft 13 is transmitted to the steerable wheels 3 through tie rods 14, which are connected to opposite ends of the rack shaft 13. This changes the steering angle of each of the steerable wheels 3, thus changing the proceeding direction of the vehicle.

An assist mechanism 2 includes a motor 20, which applies assist torque to the steering shaft 11. The motor 20 is configured by a brushless motor. Rotation of the motor 20 is transmitted to the steering shaft 11 through a decelerator 21. This applies motor torque to the steering shaft 11 such that the steering operation is assisted.

The electric power steering apparatus includes various types of sensors for defecting the manipulation amount of the steering wheel 10 and quantities of state of the vehicle. For example, a torque sensor 5 serving as a sensor device is arranged in the steering shaft 11. The torque sensor 5 includes two sensor ICS 50, 51 each serving as a sensor section for detecting the steering torque applied to the steering shaft 11 through the steering operation by the driver. In other words, in the torque sensor 5, the sensor ICs are provided as a dual system. The sensor ICs 50, 51 are configured identically and each output a voltage signal corresponding to a detected torque value as a detection signal Sτ. The range of the detection signal Sτ is set to the range of "Vmin≤Sτ≤Vmax". The lower limit value Vmin is greater than 0 volts, which corresponds to the ground potential, and is 0.5 volts in the first embodiment. The upper limit value Vmax is smaller than or equal to power source voltage and is 4 volts in the first embodiment. Each of the sensor ICs 50, 51 outputs an abnormality diagnosis signal Sd, which is configured by a predetermined waveform, instead of the detection signal Sτ for a predetermined time period after electric power supply no the sensor IC 50, 51 is started. Each sensor IC 50, 51 has a self-diagnosis function to monitor whether there is an abnormality in the sensor IC 50, 51. In the case of sensor ICs configured as a dual system by detection elements, the self-diagnosis function is carried out by a publicly known method in which output signals of the detection elements are compared and an abnormality is detected if there is a difference exceeding a predetermined value between the output signals. In the first embodiment, when each sensor IC 50, 51 detects an abnormality in the sensor IC 50, 51 through self-diagnosis, the sensor IC 50, 51 outputs an abnormality detection signal Se, which is a certain voltage value Ve (for example, 0.2 volts). The vehicle includes a vehicle speed sensor 6. The vehicle speed sensor 6 detects the traveling speed of the vehicle and outputs the voltage signal corresponding to the detected traveling speed as a detection signal Ss. The motor 20 includes a rotation angle sensor 7. The rotation angle sensor 7 detects the rotation angle of the motor 20 and outputs the voltage signal corresponding to the detected motor rotation angle as a detection signal Sθ. The signals output by the sensors 5, 6, 7 are received by the motor control device 4. The motor control device 4 controls the driving of the motor 20 based on the signals output by the sensors 5 to 7.

Figure 2:
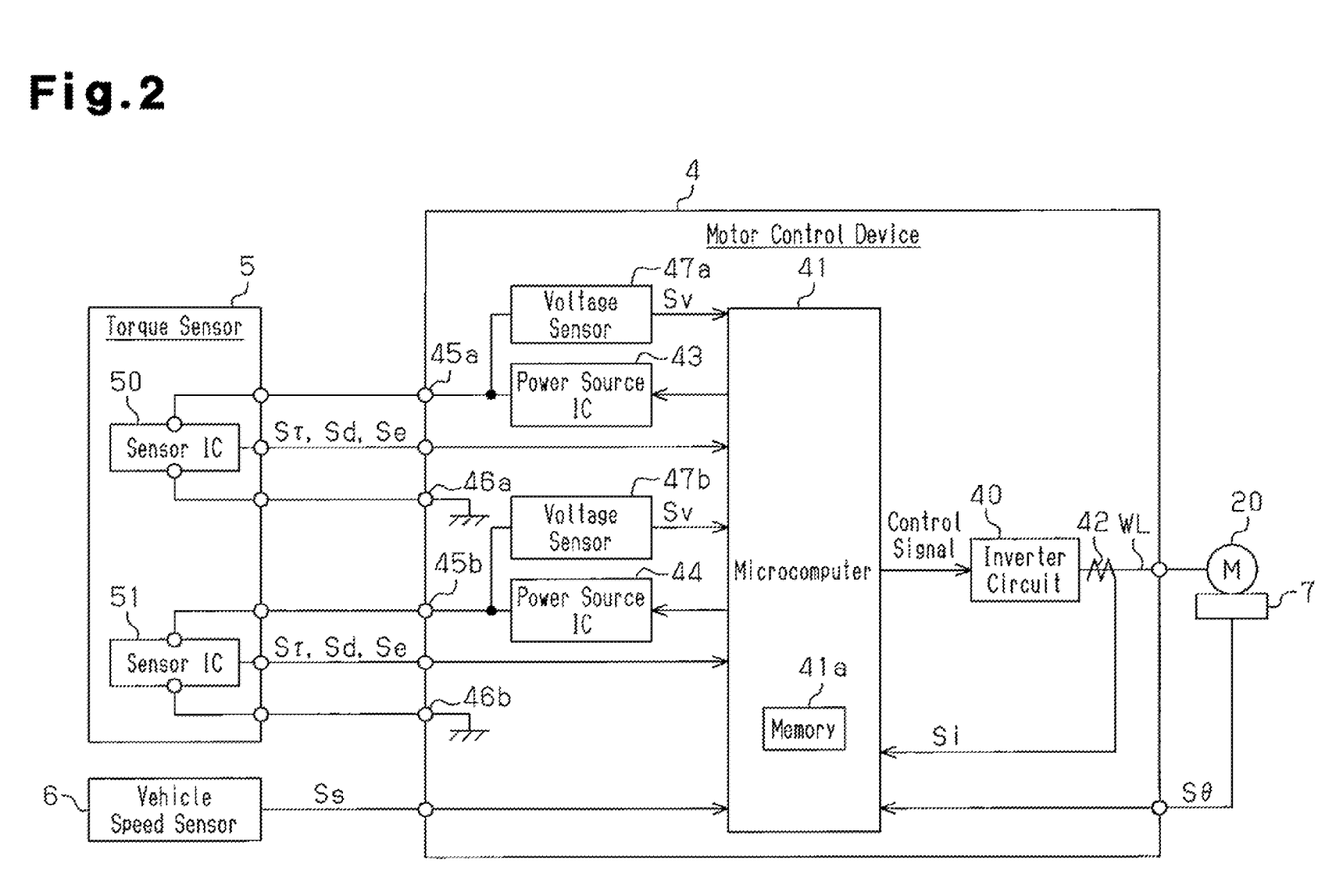
FIG. 2 is a block diagram representing the configuration of a motor control device according to the first embodiment.

With reference to FIG. 2, the motor control device 4 has an inverter circuit. 40 and a microcomputer 41. The inverter circuit 40 converts DC electric power supplied from a power source such as the battery of the vehicle into AC electric power of three phases (U-phase, V-phase, and W-phase). The microcomputer 41 subjects the inverter circuit 40 to (pulse width modulation) control. In the first embodiment, the microcomputer 41 corresponds to a control section.

The inverter circuit 40 converts DC electric power supplied from the power source to three-phase AC electric power based on a control signal (a PWM drive signal) from the microcomputer 41. The three-phase AC electric power is supplied to the motor 20 through three feed lines WL corresponding to the respective phases. Each of the feed lines WL has an electric current sensor 42. In FIG. 2, only one of the feed lines WL and only one of the electric current sensors 42 are shown for illustrative purposes. Each of the electric current sensors 42 detects a phase electric current value of the associated one of the feed lines WL and outputs a voltage signal corresponding to the detected phase electric current value as a detection signal Si. The detection signal Si of each electric current sensor 42 is received by the microcomputer 41.

The microcomputer 41 receives the signals Sτ, Sd, Se output by the sensor ICS 50, 51 of the torque sensor 5, the detection signal Ss of the vehicle speed sensor 6, and the detection signal Sθ of she rotation angle sensor 7. The microcomputer 41 obtains the torque value, the vehicle speed, the motor rotation angle, and the respective phase electric current values based on the detection signals Sτ, Ss, Sθ, Si from the corresponding sensors 5 to 7 and 42. The microcomputer 41 then sets a target assist torque based on the torque value and the vehicle speed. The microcomputer 41 generates a control signal by feed-back controlling the electric current flowing in the motor 20 using the motor rotation angle and the phase electric current values such that the assist torque applied from the motor 20 to the steering shaft 11 becomes equal to the target assist torque. In this manner, the driving of the motor 20 is controlled and assist control is carried out to apply assist torque to the steering shaft 11.

The motor control device 4 includes power source ICs 43, 44, each of which supplies operating voltage to the corresponding one of the sensor ICs 50, 51 of the torque sensor 5. Each power source IC 43, 44 adjusts the power source voltage of the battery of the vehicle to operating voltage suitable for the corresponding sensor IC 50, 51 and supplies the adjusted operating voltage to a corresponding power source terminal 45a, 45b of the motor control device 4. The motor control device 4 includes ground terminals 46a, 46b, which are set to the ground potentials. The sensor IC 50 is connected to the power source terminal 45a and the ground terminal 46a through corresponding lines to ensure a power source for the sensor IC 50. The sensor IC 51 is connected to the power source terminal 45b and the ground terminal 46b through corresponding lines to ensure a power source for the sensor IC 51. The power source ICs 43, 44 not only supplies electric power to the corresponding sensor ICs 50, 51 but also selectively block and resume electric power supply to the sensor ICs 50, 51 in response to a command from the microcomputer 41.

The motor control device 4 includes voltage sensors 47a, 47b. Each one of the voltage sensors 47a, 47b detects the power source voltage of the corresponding one of the sensor ICs 50, 51 and outputs the voltage signal corresponding to the detected power source voltage to the microcomputer 41 as a detection signal Sv. This allows the microcomputer 41 to obtain the power source voltage of each sensor IC 50, 51 based on the detection signal Sv of the corresponding voltage sensor 47a, 47b.

Operation of the sensor ICs 50, 51 will hereafter be described with reference to FIGS. 3(a) and 3(b). Since the sensor ICs 50, 51 operate in the same manner, only operation of the sensor IC 50, which represents the sensor ICs 50, 51, is discussed below to facilitate description.

Figure 3A:
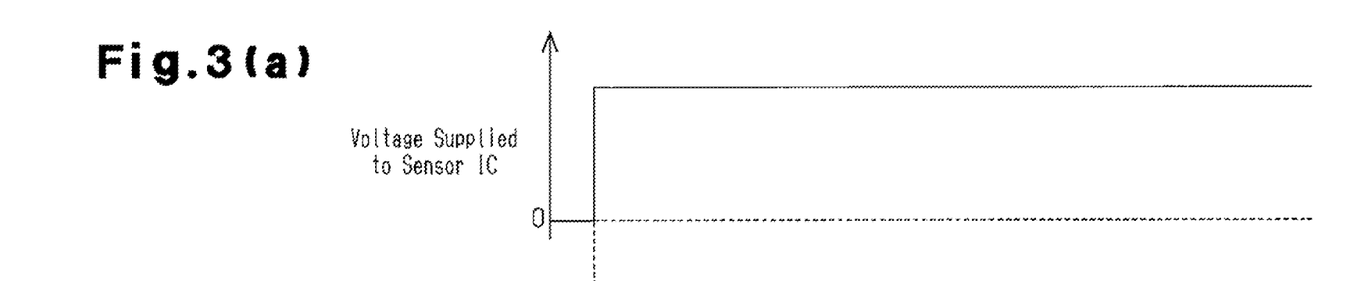
FIGS. 3(a) and 3(b) are timing charts representing changes in voltage supplied to a sensor IC and changes in an output signal of the sensor IC, respectively.
Figure 3B:
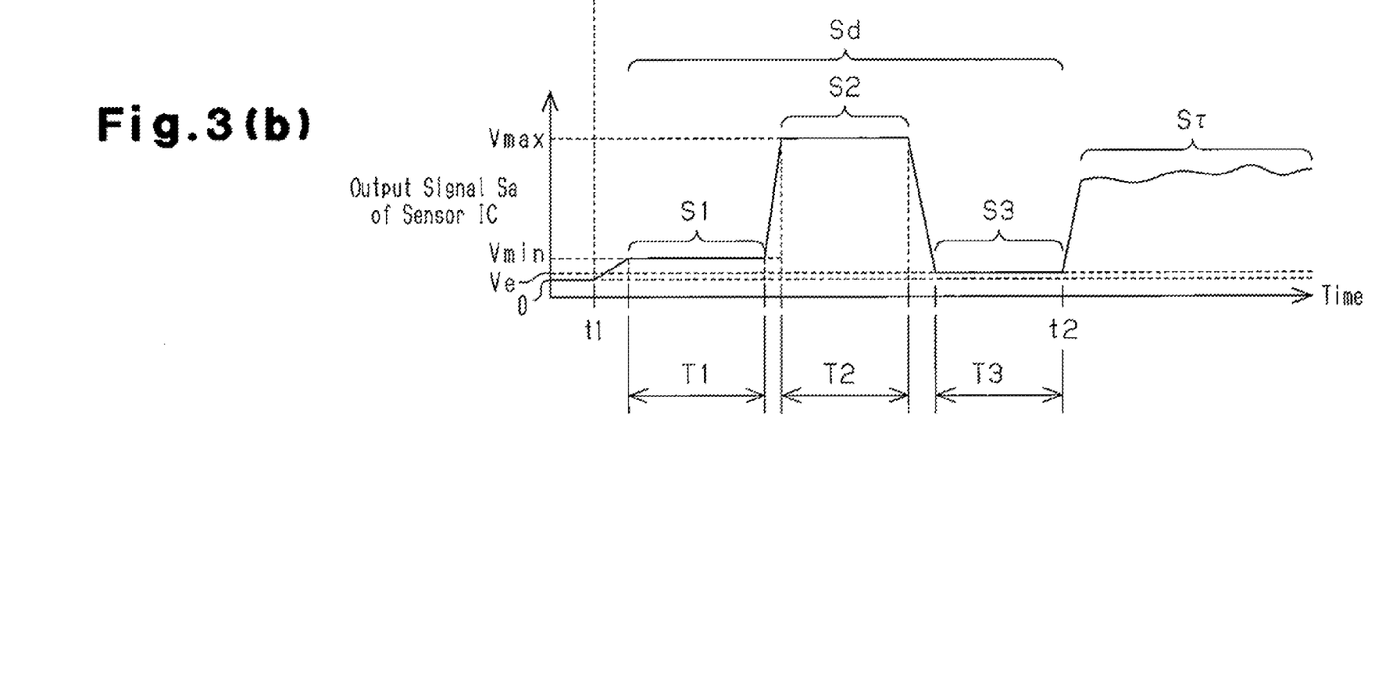

With reference to FIG. 3(a), if the electric power supply to the sensor IC 50 is started at a point in time t1, the output signal (the output voltage) Sa of the sensor IC 50 changes as represented in FIG. 3(b). That is, the sensor IC 50 first outputs the abnormality diagnosis signal Sd, which is configured by a predetermined waveform and used for determining whether there is an output abnormality in the sensor IC 50. Specifically, the sensor IC 50 outputs a first signal S1, a second signal S2, and a third signal S3 sequentially after the point in time t1, at which the electric power supply is started. The first signal S1 is configured by a waveform in which the output at the level corresponding to the lower limit value Vmin of the detection signal Sτ continues for a predetermined time period T1. The second signal S2 is configured by a waveform in which the output at the level corresponding to the upper limit value Vmax of the detection signal Sτ continues for a predetermined time period T2. The third signal S3 is configured by a waveform in which the output at the level corresponding to the abnormality detection signal Se continues for a predetermined time period T3. In other words, the sensor IC 50 spontaneously and intentionally outputs, as a third signal, the signal identical to the signal that is output when the sensor IC 50 detects an abnormality of the sensor IC 50 through self-diagnosis. The first to third signals S1 to S3 configure the abnormality diagnosis signal Sd. The sensor IC 50 outputs the detection signal Sτ after a point in time t2 at which output of the abnormality diagnosis signal Sd is ended.

As a result, if, for example, an abnormality such as an offset detection signal Sτ occurs in the sensor IC 50, the first signal S1 output from the sensor IC 50 becomes different from the detection signal lower limit value Vmin. In this case, the microcomputer 41 cannot, detect the detection signal lower limit value Vmin in the period in which the sensor IC 50 is supposed to output the first signal S1. This allows the microcomputer 41 to determine that an abnormality has occurred in the output of the sensor IC 50.

If an abnormality such as a detection signal Sτ having a changing gain occurs in the sensor IC 50, the second signal S2 output by the sensor IC 50 becomes different from the detection signal upper limit value Vmax. In this case, the microcomputer 41 cannot detect the detection signal upper limit value Vmax in the period in which the sensor IC 50 is supposed to output the second signal S2. This allows the microcomputer 41 to determine that an abnormality has occurred in the output of the sensor IC 50.

Also, if there is an abnormality in the self-diagnosis function of the sensor IC 50 and the sensor IC 50 performs the output that should be detected as an abnormality through the self-diagnosis, the microcomputer 41 cannot detect the abnormality detection signal Se, which is supposed to be output by the sensor IC 50. Accordingly, if the microcomputer 41 cannot detect the abnormality detection signal Se in the period in which the sensor IC 50 is supposed to output the third signal S3, the microcomputer 41 determines that there is an abnormality in the self-diagnosis function of the sensor IC 50. Also, if the microcomputer 41 detects the abnormality detection signal Se in the period in which the sensor IC 50 is supposed to output the third signal S3, the microcomputer 41 determines that the self-diagnosis function of the sensor IC 50 is carried out normally.

By this method, in which an output abnormality of the sensor IC 50 is detected based on the abnormality diagnosis signal Sd, the output abnormality of the sensor IC 50 is detectable even when the sensor IC 50 is the only sensor IC that operates normally.

The abnormality detection method of the sensor ICs 50, 51 performed, by the microcomputer 41 will hereafter be described.

When the sensor ICs 50, 51 both operate normally, the microcomputer 41 controls the driving of the motor 20 using the detection signal Sτ of one of the sensor ICs 50, 51. While controlling the driving of the motor 20, the microcomputer 41 compares the detection signals Sτ of the sensor ICs 50, 51 to monitor whether the sensor ICs 50, 51 operate normally. If the microcomputer 41 detects an abnormality of one of the sensor ICs 50, 51, the microcomputer 41 continuously controls the driving of the motor based on the detection signal of the sensor IC that operates normally, an abnormality of which has not been detected. To facilitate description, the description below is focused on a case in which an abnormality is detected in the sensor IC 51 and the sensor IC 50 is the only sensor IC that operates normally.

If the sensor IC 50 is the only sensor IC that operates normally, the microcomputer 41 cannot detect an abnormality of the sensor ICs 50, 51 by comparing the detection signals Sτ of the sensor ICs 50, 51. To solve this problem, in the first embodiment, when the sensor IC 50 is the only sensor IC that operates normally, the microcomputer 41 periodically performs a procedure of temporarily blocking electric power supply to the sensor IC 50 and then resuming the electric power supply to the sensor IC 50 by means of the power source IC 43. This causes the sensor IC 50 to alternately output the abnormality diagnosis signal Sd and the detection signal Sτ. Accordingly, the microcomputer 41 determines whether there is an abnormality in the sensor IC 50 based on the abnormality diagnosis signal Sd in the period in which the sensor IC 50 outputs the abnormality diagnosis signal Sd.

If the sensor IC 50 alternately outputs the abnormality diagnosis signal Sd and the detection signal Sτ, the microcomputer 41 cannot obtain the torque value τ while the sensor IC 50 outputs the abnormality diagnosis signal Sd. Therefore, it is necessary to consider the way in which the microcomputer 41 controls the driving of the motor 20 when the sensor IC 50 outputs the abnormality diagnosis signal Sd. In this regard, the microcomputer 41 of the first embodiment detects the torque value τ based on the detection signal S1 of the sensor IC 50 immediately before blocking the electric power supply to the sensor IC 50 and stores the detected torque value τ in a memory 41a as a hold value τh. The microcomputer 41 then sets a target assist torque based on the hold value τh stored in the memory 41a and controls the driving of the motor 20. In this manner, the driving of the motor 20 is continuously controlled even in the period in which the sensor IC 50 outputs the abnormality diagnosis signal Sd.

Steps of an abnormality detection procedure of the sensor IC 50 and steps of a motor driving control procedure performed by the microcomputer 41 will now be described with reference to FIGS. 4 to 6(c).

Figure 4:
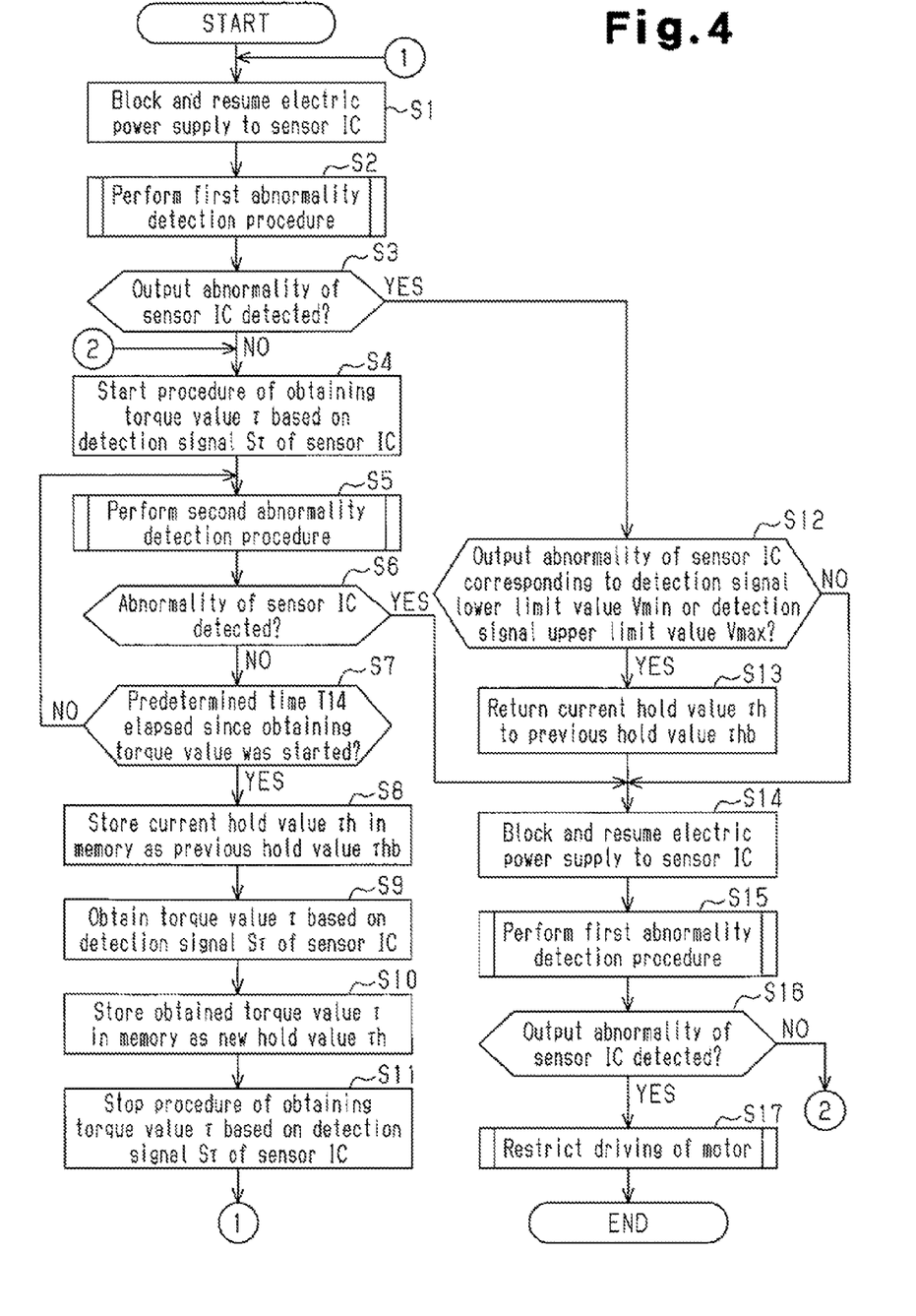
FIG. 4 is a flowchart representing steps of an abnormality detection procedure of the sensor IC and steps of a motor driving control procedure performed by the motor control device of the first embodiment.
Figure 5:
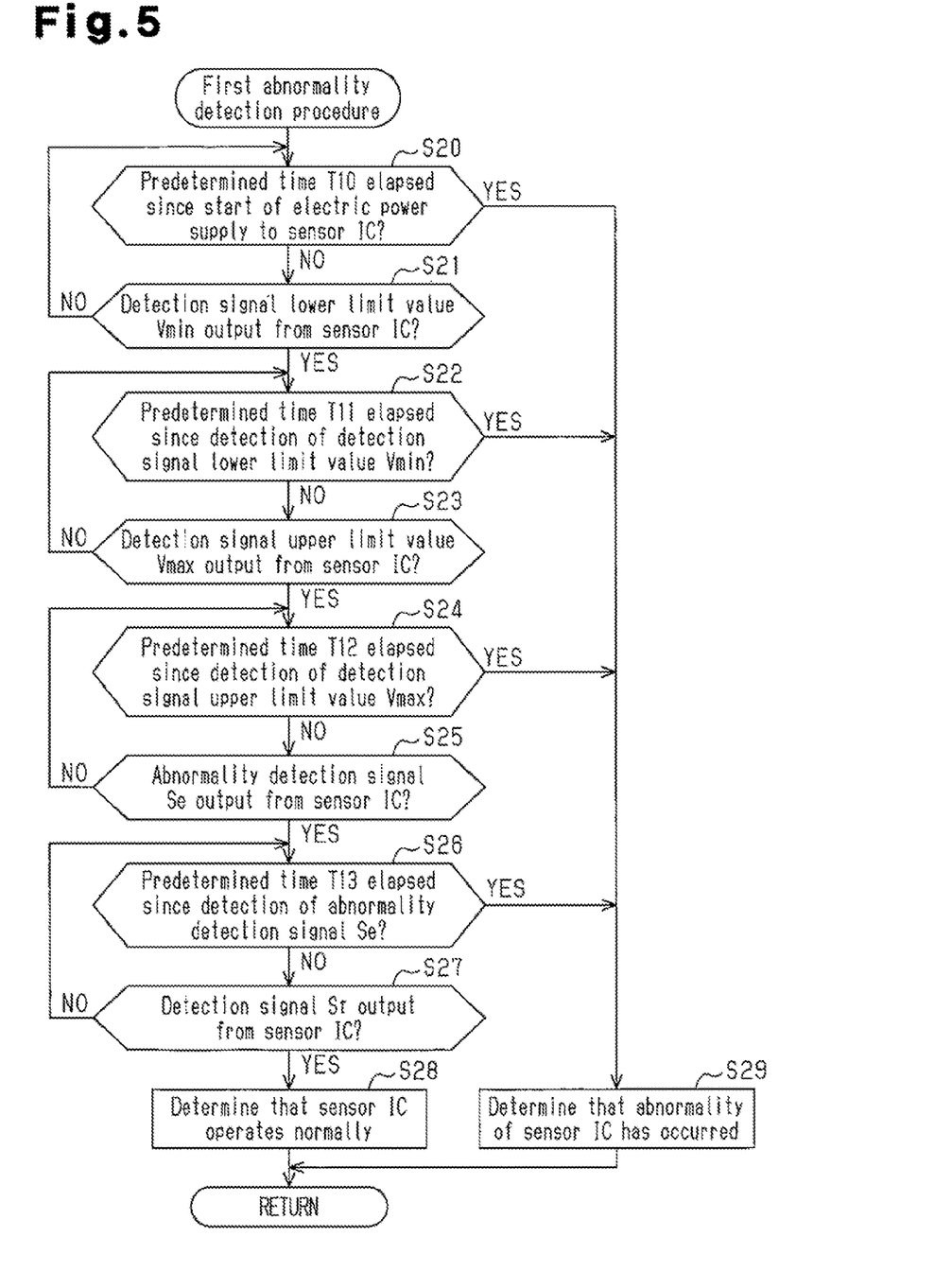
FIG. 5 is a flowchart representing steps of a first abnormality detection procedure performed by the motor control device of the first embodiment.
Figures 6A, 6B:
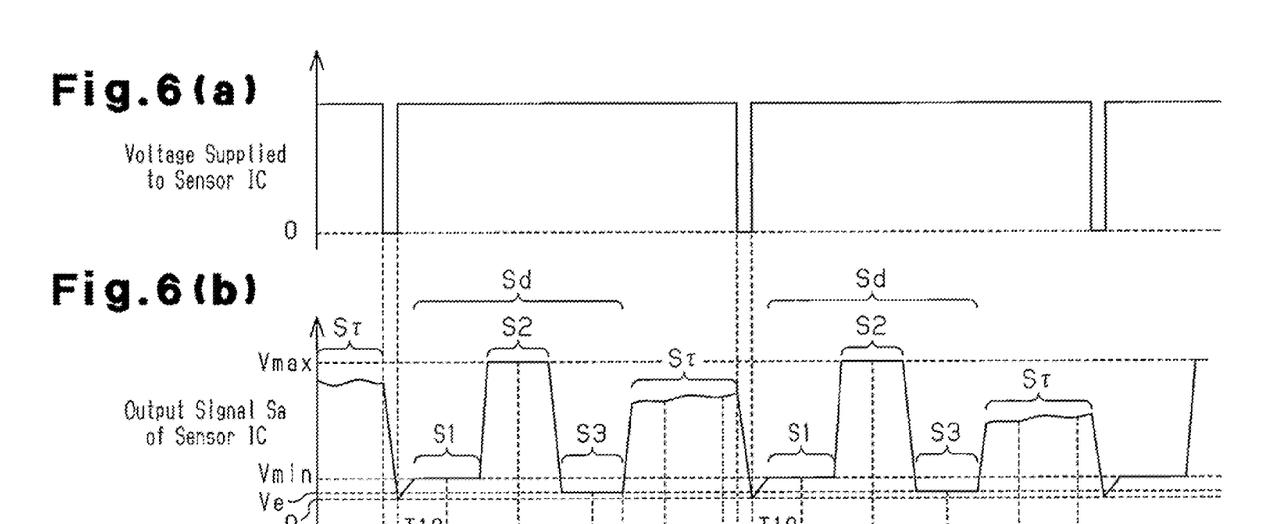
FIGS. 6(a), 6(b), and 6(c) are timing charts representing changes in voltage supplied to the sensor IC, changes in the output signal of the sensor IC, and changes in a hold value, respectively, in the motor control device of the first embodiment.

With reference to FIGS. 4 and 6(a), the microcomputer 41 temporarily blocks electric power supply to the sensor IC 50 at a point in time t10 and then resumes the electric power supply to the sensor IC 50 at a point in time t11 (Step S1). This causes the sensor IC 50 to output the abnormality diagnosis signal Sd. In other words, as represented in FIG. 6(b), the sensor IC 50 outputs the first signal S1, the second signal S2, and the third signal S3 sequentially after the point in time t11, at which the electric power supply is resumed. At this stage, the microcomputer 41 executes a first abnormality detection procedure corresponding to the case in which the abnormality diagnosis signal Sd is output (Step S2). The steps of the first abnormality detection procedure are represented in FIG. 5.

That is, the microcomputer 41 determines whether a predetermined time period T10 has elapsed since the point in time t11, at which the electric power supply to the sensor IC 50 was resumed (Step S20). The time period T10 is set as time longer than the output time period T1 of the first signal S1 of the abnormality diagnosis signal Sd. When the time period T10 has net yet elapsed since the point in time t11, at which the electric power supply to the sensor IC 50 was resumed (Step S20: NO), the microcomputer 41 determines whether the sensor IC 50 outputs the detection signal lower limit value Vmin (Step S21). Specifically, with the output error of the sensor IC 50 defined as "ΔV", the microcomputer 41 determines whether the output signal Sa of the sensor IC 50 satisfies the relationship represented by the expression "Vmin−ΔV≤Sa≤Vmin+ΔV" for a certain time or longer.

If the microcomputer 41 detects the output of the detection signal lower limit value Vmin by the sensor IC 50 (Step S21: YES), the microcomputer 41 determines whether a predetermined time period T11 has elapsed since a point in time t12, at which the detection signal lower limit value Vmin was detected (Step S22). The time period T11 is set as time that is longer than the output time period T2 of the second signal S2 of the abnormality diagnosis signal Sd and shorter that the time obtained by adding the output times of the first signal S1 and the second signal S2 together (T1+T2). If the time period T11 has not yet elapsed since the point in time t12, at which the detection signal lower limit value Vmin was detected (Step S22: NO), the microcomputer 41 determines whether the sensor IC 50 outputs the detection signal upper limit value Vmax (Step S23). Specifically, the microcomputer 41 determines whether the output signal Sa of the sensor IC 50 satisfies the relationship represented by the expression "Vmax−ΔV≤Sa≤Vmax+ΔV" for a certain time or longer.

If the microcomputer 41 detects the output of the detection signal upper limit value Vmax by the sensor IC 50 (Step S23: YES), the microcomputer 41 determines whether a predetermined time period t12 has elapsed since a point in time t13, at which the detection signal upper limit value Vmax was detected (Step S24). The time period T12 is set as time that is longer than the output time period T3 of the third signal S3 of the abnormality diagnosis signal Sd and shorter than the time obtained by adding the output times of the second signal S2 and the third signal S3 together (T2+T3). If the time period T12 has not yet elapsed since the point in time t13, at which the detection signal upper limit value Vmax was detected (Step S24: NO), the microcomputer 41 determines whether the sensor IC 50 outputs the abnormality detection signal Se (Step S25). Specifically, the microcomputer 41 determines whether the output signal Sa of the sensor IC 50 has continued to be the voltage value Ve for a certain time or longer.

If the microcomputer 41 detects the output of the abnormality detection signal Se by the sensor IC 50 (Step S25: YES), the microcomputer 41 determines whether a predetermined time period T13 has elapsed since a point in time t14, at which the abnormality detection signal Se was detected (Step S26). The time period T13 is set as time longer than the output time period T3 of the third signal S3 of the abnormality diagnosis signal Sd. If the time period T13 has not yet elapsed since the point in time t14, at which the abnormality detection signal Se was detected (Step S26: NO), the microcomputer 41 determines whether the sensor IC 50 outputs the detection signal Sτ (Step S27). Specifically, the sensor IC 50 outputs the detection signal Sτ after a point in time t15, at which the output of the abnormality diagnosis signal Sd is ended. Accordingly, the microcomputer 41 determines whether the sensor IC 50 outputs the detection signal Sτ depending on whether the output signal Sa of the sensor IC 50 satisfies the relationship represented by the expression "Vmin≤Sa≤Vmax" for a certain time or longer.

If the microcomputer 41 determines at a point in time t16 that the sensor IC 50 outputs the detection signal Sτ (Step S27: YES), the microcomputer 41 determines that the sensor IC 50 operates normally (Step S28).

In contrast, the microcomputer 41 determines that there is an abnormality in the sensor IC 50 when the condition (a1), (a2), (a3), and (a4), which are described below, are satisfied (Step S29).

(a1) without output of the detection signal lower limit value Vmin from the sensor IC 50 (Step S21: NO), the time period t10 elapses since the point in time 11, at which the electric power supply to the sensor IC 50 was resumed (Step S20: YES).

(a2) Without output of the detection signal upper limit value Vmax from the sensor IC 50 (Step S23: NO), the time period T11 elapses since the point in time 12, at which the detection signal lower limit value Vmin was detected (Step S22: YES).

(a3) Without output of the abnormality detection signal Se from the sensor IC 50 (Step S25: NO), the time period T12 elapses since the point in time 13, at which the detection signal tipper limit value Vmax was detected (Step S24: YES).

(a4) Without output of the detection signal Sτ from the sensor IC 50 (Step S27: NO), the time period T13 elapses since the point in time t14, at which the abnormality detection signal Se was detected (Step S26: YES).

Then, with reference to FIG. 4, after carrying out the first abnormality detection procedure in Step S2, the microcomputer 41 determines whether an output abnormality of the sensor IC 50 has been detected by the first abnormality detection procedure (Step S3). If the output abnormality of the sensor IC 50 has not been detected by the first abnormality detection procedure (Step S3: NO), or, in other words, the sensor IC 50 operates normally, the microcomputer 41 starts at the point in time t16 a procedure of obtaining the torque value τ based on the detection signal Sτ of the sensor IC 50 (Step S4). While performing the procedure of obtaining the torque value τ based on the detection signal Sτ of the sensor IC 50, the microcomputer 41 executes a second abnormality detection procedure corresponding to the case in which the detection signal Sτ is output (Step S5). The second abnormality detection procedure is performed to detect abnormalities (b1) and (b2), which will be described below.

(b1) A power supply fault (electrical connection to the power source) or ground fault (electrical connection to the ground) of the signal line for transmitting the detection signal Sτ from the sensor IC 50 to the microcomputer 41. If the output signal Sa of the sensor IC 50 has continued to be at the level corresponding to the power source voltage, the microcomputer 41 determines that the power supply fault has occurred in the signal line of the sensor IC 50. If the output signal Sa of the sensor IC 50 has continued to be at 0 volts, the microcomputer 41 determines that the ground fault has occurred in the signal line of the sensor IC 50.

(b2) An abnormality of the power source voltage of the sensor IC 50. If the power source voltage of the sensor IC 50 detected by the voltage sensor 47*a* is out of a normal range, the microcomputer 41 determines that the power source voltage of the sensor IC 50 is abnormal.

Figure 6C:
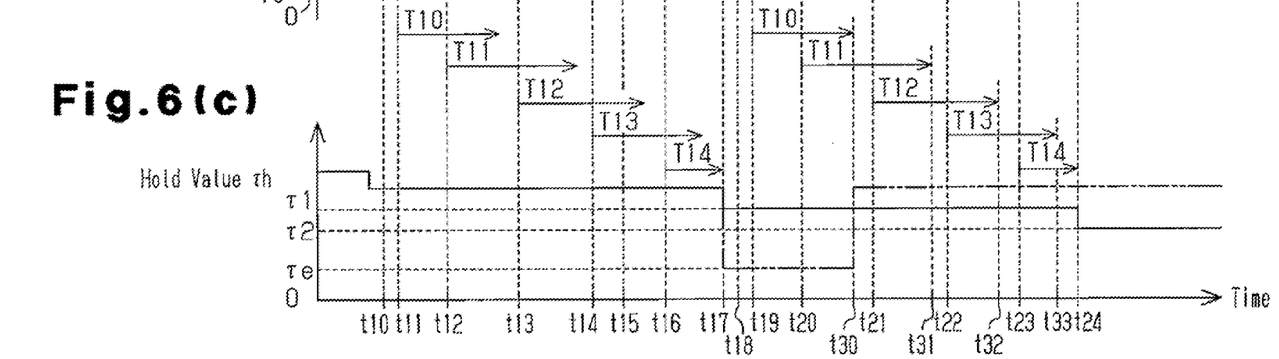

Then, the microcomputer 41 determines whether an abnormality of the sensor IC 50 has been detected by the second abnormality detection procedure (Step S6). If an abnormality of the sensor IC 50 has not been detected (Step S6: NO), the microcomputer 41 determines at Step S7 whether a predetermined time period T14 has elapsed since the point in time t16, at which detection of the torque value τ was started in Step S4. When the time period T14 has not yet elapsed since the point in time t16, at which detection of the torque value τ was started (Step S7: NO), the microcomputer 41 repeats the second abnormality detection procedure (Step S5). The microcomputer 41 then determines whether an abnormality of the sensor IC 50 has been detected (Step S6). If an abnormality of the sensor IC 50 has not been detected by the second abnormality detection procedure (Step S6: NO) and the time period T14 has elapsed since the point in time t16, at which detection of the torque value τ was started (Step S7: YES), the microcomputer 41 stores the current hold value τh in the memory 41*a* as the previous hold value τhb at a point in time t1, at which the time period T14 has elapsed since the point in time t16 (Step S8). Also, as represented in FIG. 6(*c*), the microcomputer 41 obtains a torque value τ1 based on the detection signal Sτ of the sensor IC 50 at the point in time t17 (Step S9) and stores the obtained torque value τ1 in the memory 41*a* as a new hold value τh (Step S10). Subsequently, the microcomputer 41 ends the procedure of obtaining the torque value τ based on the detection signal Sτ of the sensor IC 50 (Step S11) and then carries out Step S1. In other words, with reference to FIG. 6(*a*), the microcomputer 41 performs a procedure of temporarily blocking electric power supply to the sensor IC 50 at a point in time t18 and then resuming the electric power supply to the sensor IC 50 at a point in time t19. Afterwards, by repeating the procedure periodically, the microcomputer 41 causes the sensor IC 50 to alternately output the abnormality diagnosis signal Sd and the detection signal Sτ. The microcomputer 41 then determines whether there is an output abnormality in the sensor IC 50 based on the abnormality diagnosis signal Sd each time the sensor IC 50 outputs the abnormality diagnosis signal Sd. The microcomputer 41 updates the hole value τh each time the sensor IC 50 outputs the detection signal Sτ.

The microcomputer 41 controls the driving of the motor 20 based on the updated hold value τh, referring to FIG. 6(*c*). This allows the microcomputer 41 to continuously control the driving of the motor 20 even when the sensor IC 50 outputs the abnormality diagnosis signal Sd.

With reference to FIG. 4, if an output abnormality of the sensor IC 50 is defected by the first abnormality detection procedure of Step S2 (Step S3: YES), the microcomputer 41 determines whether the output abnormality of the sensor IC 50 is the output abnormality corresponding to the detection signal lower limit value Vmin or the output abnormality corresponding to the detection signal upper limit value Vmax (Step S12). If the output abnormality of the sensor IC 50 is the output abnormality corresponding to the detection signal lower limit value Vmin or the output abnormality corresponding to the detection signal upper limit value Vmax (Step S12: YES), the detection signal Sτ of the sensor IC 50 may have been set to an abnormal value τe, which is widely different from the value corresponding to the actual steering torque, at the point in time t17 at which the torque value τ used as the hold value τh was obtained, as represented by the double-dotted chain lines in FIG. 6(*c*). Accordingly, if, for example, an abnormality of the sensor IC 50 is detected at a point in time t30 (Step S12: YES), the microcomputer 41 of the first embodiment returns the current hold value τh to the previous hold value τhb (Step S13) such that the driving of the motor 20 is prevented from being controlled based on the abnormal hold value τh. Then, the microcomputer 41 temporarily blocks electric power supply to the sensor IC 50 and then resumes the electric power supply to the sensor IC 50 (Step S14). The microcomputer 41 then repeats the first abnormality detection procedure (Step S15). If the output abnormality of the sensor IC 50 is an abnormality other than an output abnormality corresponding to the detection signal lower limit value Vmin or the output abnormality corresponding to the detection signal upper limit value Vmax (Step S12: NO), the microcomputer 41 carries out Steps S14 and S15 without performing Step S13. The microcomputer 41 performs Steps S14 and S15 also when an abnormality of the sensor IC 50 is detected by the second abnormality detection procedure of Step S5 (Step S6: YES). Then, the microcomputer 41 determines whether an output abnormality of the sensor IC 50 has been detected by the first abnormality detection procedure of Step S15 (Step S16). If an output abnormality of the sensor IC 50 has not been detected (Step S16: NO), or, in other words, the sensor IC 50 operates normally, the microcomputer 41 carries out Step S4 and the subsequent steps.

In contrast, if an abnormality of the sensor IC 50 has been detected by the first abnormality detection procedure of Step S15 (Step S16: YES), the microcomputer 41 restricts the driving of the motor 20 (Step S17). A procedure of restricting motor operation may be, for example, a procedure of gradually decreasing the assist torque applied from the motor 20 to the steering shaft 11 or a procedure of stopping the driving of the motor 20.

When the sensor IC 51 is the only sensor IC that operates normally, the microcomputer 41 executes the procedures of FIGS. 4 and 5 on the sensor IC 51. As a result, even if the sensor IC 51 is the only sensor IC that operates normally, the above-described advantages are ensured.

As has been described, the sensor ICs 50, 51, the motor control device 4, and the electric power steering apparatus of the first embodiment have the advantages described below.

(1) After the electric power supply to the sensor ICs 50, 51 is started, the sensor ICs 50, 51 each output the abnormality diagnosis signal Sd, which is configured by a predetermined waveform and used for determining whether there is an output abnormality, and then output the detection signal Sτ. Accordingly, even if an abnormality occurs in one of the sensor ICs 50, 51 and only one sensor IC is capable of detecting steering torque, an output abnormality of the sensor IC is detectable.

(2) The abnormality diagnosis signal Sd includes the waveform in which the output at the level corresponding to the detection signal lower limit value Vmin continues for the predetermined time period T1 and the waveform in which the output at the level corresponding to the detection signal upper limit value Vmax continues for the predetermined time period T2. This allows detection of an abnormality of the detection signal Sτ of each sensor IC 50, 51, which is, specifically, an offset detection signal Sτ or a detection signal Sτ having a changing gain.

(3) The abnormality diagnosis signal Sd includes the waveform in which the output at the level corresponding to the abnormality detection signal Se continues for the predetermined time period T3. This facilitates detection of an abnormality in the abnormality diagnosis function of each sensor IC 50, 51.

(4) By periodically blocking and resuming the electric power supply to each sensor IC 50, 51, the microcomputer 41 causes the sensor IC 50, 51 to alternately output the abnormality diagnosis signal Sd and the detection signal Sτ. The microcomputer 41 detects an abnormality of the sensor ICs 50, 31 based on the abnormality diagnosis signal Sd. Further, the microcomputer 41 updates the hold value τh using the torque value τ obtained based on the detection signal Sτ each time the sensor IC 50, 51 outputs the detection signal Sτ. In the period in which each sensor IC 50, 51 outputs the abnormality diagnosis signal Sd and the detection signal Sτ, the microcomputer 41 sets the target assist torque based on the hold value τh and controls the driving of the motor 20. As a result, while continuously controlling the driving of the motor 20, the microcomputer 41 is allowed to detect an output abnormality of each sensor IC 50, 51.

(5) If the microcomputer 41 detects an output abnormality of the sensor IC 50, 51, which is, in other words, the output abnormality corresponding to the detection signal lower limit value Vmin or the detection signal upper limit value Vmax, based on the abnormality diagnosis signal Sd output from the sensor IC 50, 51 immediately after the hold value τh is updated, the microcomputer 41 returns the hold value τh to the previous hold value τhb. This prevents the microcomputer 41 from continuing control of the driving of the motor 20 using an abnormal hold value τh. As a result, continuous inappropriate driving of the motor 20 is avoided.

(6) If an output abnormality of the sensor IC 50, 51 is not detected based on the abnormality diagnosis signal Sd output from the sensor IC 50, 51, the microcomputer 41 determines whether the sensor IC 50, 51 outputs the detection signal Sτ. Then, on condition that an output abnormality of the sensor IC 50, 51 is not detected in the period from the point in time at which it is detected that the sensor IC 50, 51 outputs the detection signal Sτ to the point in time at which the predetermined time period T14 elapses, the microcomputer 41 detects the torque value τ used as the hold value τh. In this manner, the appropriate torque value τ corresponding to the actual steering torque is used as the hold value τh. This ensures appropriate driving of the motor 20.

Second Embodiment

A sensor device according to a second embodiment of she present invention will now be described. A motor control device and an electric power steering apparatus that employ the sensor device will also be described. For the second embodiment, the description below is focused on the case in which the sensor IC 50 is the only sensor IC that operates normally, as in the first embodiment. The second embodiment will be described mainly on the difference between the first embodiment and the second embodiment.

If the driving of the motor 20 is controlled based on the hold value τh as in the case of the motor control device 4 of the first embodiment and an abnormality occurs in the sensor IC 50 when the torque value τ used as the hold value τh is detected, the hold value τh becomes an abnormal value that is widely different from the actual steering torque. If the abnormality that has occurred in the sensor IC 50 is a short-time abnormality such as instantaneous interruption of a feed line of the sensor IC 50 or instantaneous interruption of an outlet line of the sensor IC 50, such an abnormality is difficult to detect. When the abnormality of the sensor IC 50 is undetectable, the microcomputer 41 continuously controls the driving of the motor 20 using the abnormal hold value τh, which is undesirable.

To solve this problem, the microcomputer 41 of the second embodiment returns the hold value τh to the value before update, which is the previous hold value τhb, when the output signal Sa of the sensor IC 50 continues to be at a level lower than or equal to a predetermined threshold value Va immediately after the torque value τ used as the hold value τh is detected.

Steps of an abnormality detection procedure of the sensor IC 50 and steps of a motor driving control executed by the microcomputer 41 will hereafter be described with reference to FIGS. 7 and 8. Same or like reference numerals are given to steps illustrated in FIG. 7 that are the same as or like corresponding steps illustrated in FIG. 4 and description of these steps is omitted herein.

Figure 7:
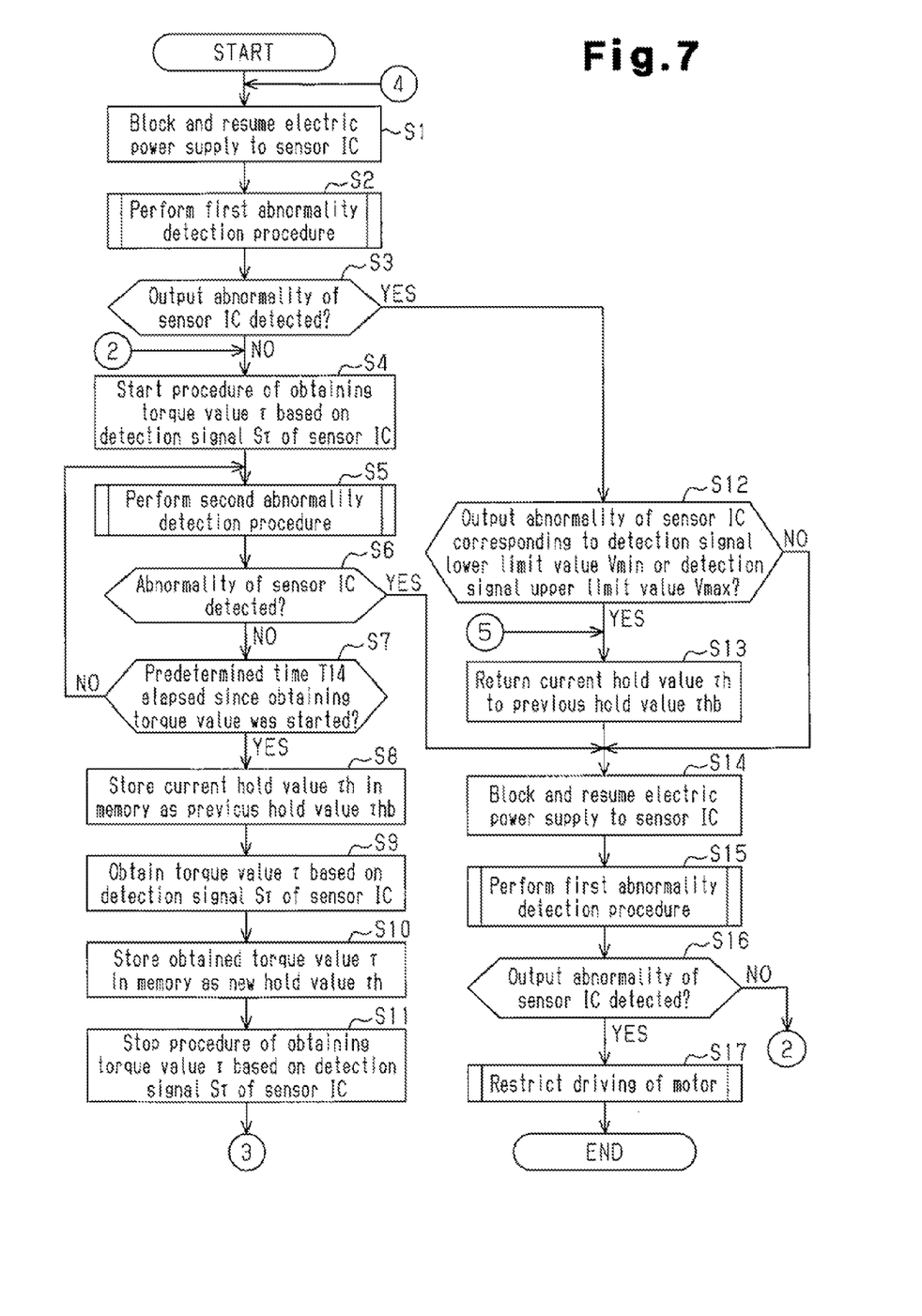
FIG. 7 is a flowchart representing steps of an abnormality detection procedure of a sensor IC and some of steps of a motor driving control procedure performed by a motor control device according to a second embodiment.
Figure 8:
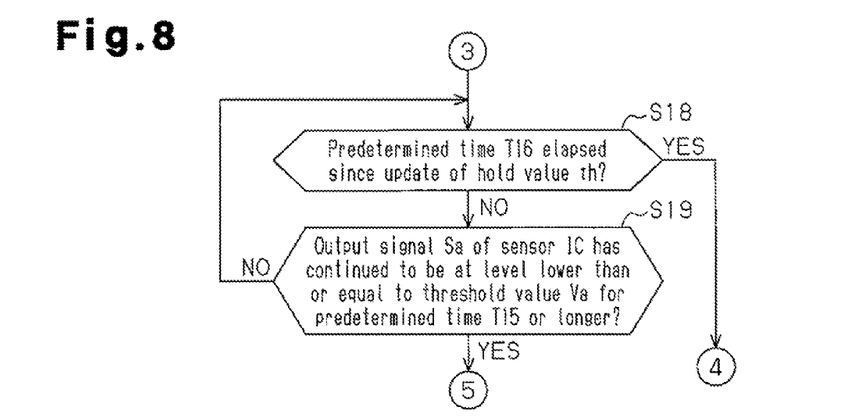
FIG. 8 is a flowchart representing steps of the abnormality detection procedure of the sensor IC and some of steps of the motor driving control procedure performed by the motor control device of the second embodiment and FIGS. 9(a), 9(b), and 9(c) are timing charts representing changes in voltage supplied to the sensor IC, changes in an output signal of the sensor IC, and changes in a hold value, respectively, in the motor control device of the second embodiment.

With reference to FIG. 7, the microcomputer 41 of the second embodiment ends the procedure of obtaining the torque value τ in Step S11 and performs the procedure represented in FIG. 8. That is, the microcomputer 41 determines whether a predetermined time period T16 has elapsed since the point in time at which the hold value τh was updated (Step S18). If the time period T16 has not yet elapsed since the point in time at which the hold value τh was updated (Step S18: NO), the microcomputer 41 determines whether the output signal Sa of the sensor IC 50 has continued to be at a level lower than or equal to the predetermined threshold value Va for a predetermined time period T15 or longer (Step S19). The threshold value Va is set as a value slightly greater than the detection signal lower limit value Vmin. When the output signal Sa of the sensor IC 50 has continued to be at a level lower than or equal to the predetermined threshold value Va for the time period 115 or longer (Step S19: YES), the microcomputer 41 determines that the hold value τh is possibly an abnormal value and performs Step S13 and the subsequent steps represented in FIG. 7. In other words, the microcomputer 41 returns the current hold value τh to the previous hold value τhb (Step S13). Then, the microcomputer 41 temporarily blocks electric power supply to the sensor IC 50 and then resumes the electric power supply to the sensor IC 50 (Step S14) before carrying out the first abnormality detection procedure (Step S15). When an abnormality of the sensor IC 50 is detected by the first abnormality detection procedure (Step S16: YES), the microcomputer 41 restricts the driving of the motor 20 (Step S17).

In contrast, in the procedure represented in FIG. 8, if the output signal Sa of the sensor IC 50 does not continue to be at a level lower than or equal to the threshold value Va for the time period T15 or longer (Step S19: NO) and the time period T16 has elapsed since the point in time at which the hold value τh was updated (Step S18: YES), the microcomputer 41 determines that the hold value τh is a normal value and carries out Step S1 and the subsequent steps represented in FIG. 7. In other words, the microcomputer 41 temporarily blocks electric power supply to the sensor IC 50 and then resumes the electric power supply to the sensor IC 50 (Step S1) before executing the first abnormality detection procedure (S2).

Operation of the motor control device 4 of the second embodiment will hereafter be described with reference to FIGS. 9(a) to 9(c).

Figures 9A, 9B, 9C:
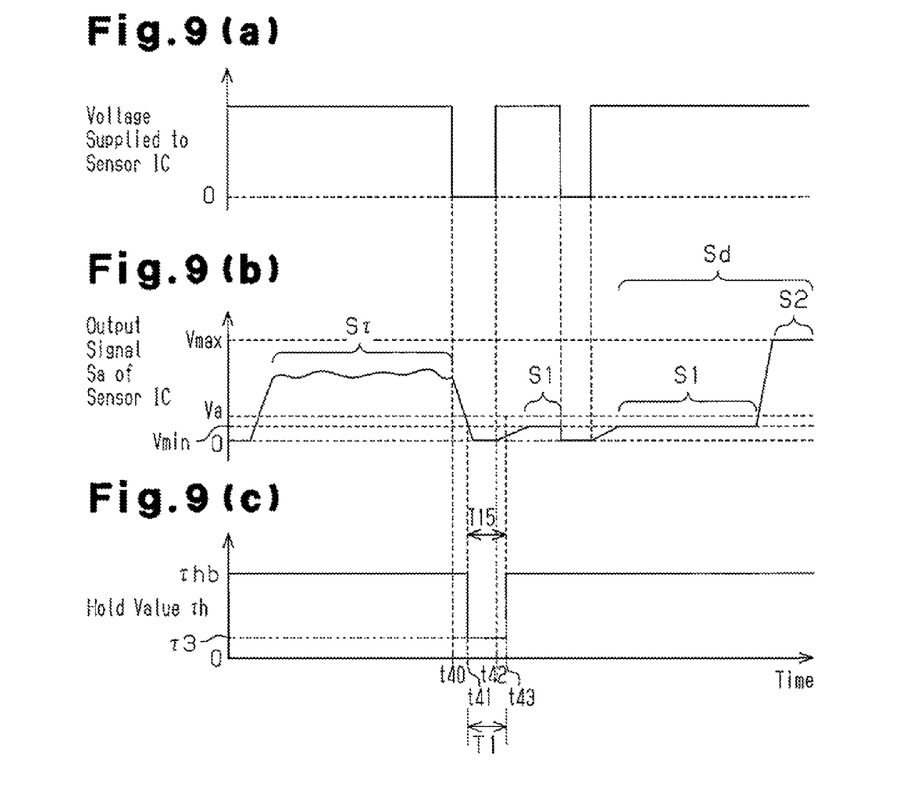

If instantaneous interruption occurs in the feed line of the sensor IC 50 at a point in time 140 as represented in FIG. 9(a), the output signal Sa of the sensor IC 50 rapidly drops from the normal value to 0 volts after the point in time t40, at which the instantaneous interruption occurs, with reference to FIG. 9(b). Then, when the electric power supply to the sensor IC 50 is resumed at a point in time t42 as represented in FIG. 9(a), the sensor IC 50 operates in the same manner as when the electric power supply to the sensor IC 50 is started, or, in other words, outputs the first signal S1 of the abnormality diagnosis signal Sd, from the point in time t45, with reference to FIG. 9(b). In this circumstance, the microcomputer 41 obtains a torque value τ3 used as the hold value τh at a point in time t41 immediately after the point in time t40, at which the instantaneous interruption occurs in the sensor IC 50. Chen, as represented in FIG. 9(c), the microcomputer 41 updates the hold value τh to the torque value τ3 such that the hold value τh becomes an abnormal value widely different from the actual steering torque.

In this case, if the output signal Sa of the sensor IC 50 continues to be at a level lower than or equal to the predetermined threshold value Va in the period from the point in time t41, at which the hold value τh is updated, to when the time period T15 elapses, the microcomputer 41 returns the hold value τh to the previous hold value τhb at a point in time t43, at which the time 15 elapses after the point in time t41, as represented in FIG. 9(c). As a result, continuous use of an abnormal value as the hold value τh does not occur and continuous inappropriate driving of the motor 20 is thus avoided. Further, the first signal S1 at the level corresponding to the detection signal lower limit value Vmin, which is slightly smaller than the threshold value Va, is output after the point in time t42, at which electric power supply to the sensor IC 50 is resumed. This allows the microcomputer 41 to reliably detect that instantaneous interruption has occurred in the feed line.

When instantaneous interruption occurs in the food line between the sensor IC 50 and the microcomputer 41, the electric power supply to the sensor IC 50 is blocked and the first signal S1 is not output. However, by setting the predetermined time period T15 to a minimum value, the microcomputer 41 is allowed to detect such instantaneous interruption.

If the sensor IC 51 is the only sensor IC that operates normally, the microcomputer 41 executes the procedures of FIGS. 7 and 8 on the sensor IC 50. Accordingly, the above-described advantages are ensured also when the sensor IC 51 is the only sensor IC that operates normally.

As has been described, the sensor ICs 50, 51 and the motor control device 4 of the second embodiment have the advantage described below in addition to the advantages (1) to (6) of the first embodiment.

(7) The microcomputer 41 determines whether the detection signal Sτ of the sensor IC 50 is abnormal immediately after detecting the torque value τ used as the hold value τh. When the detection signal Sτ is abnormal, the microcomputer 41 returns the hold value τh to the previous hold value τhb before update. In this manner, use of an abnormal value as the hold value τh is avoided such that continuous inappropriate driving of the motor 20 is avoided.

Other Embodiments

The illustrated embodiments may be modified to the forms described below.

In Step S2 of FIG. 5, whether each sensor IC 50, 51 outputs the detection signal S1 is determined based on whether the output signal Sa of the sensor IC 50, 51 satisfies the relationship represented by the expression "Vmin≤Sa≤Vmax" for a certain period of time or longer. However, according to this determination method, if the feed line of the sensor IC 50, 51 is instantaneously interrupted immediately after the sensor IC 50, 51 starts to output the detection signal Sτ, it may be erroneously determined that the sensor IC 50, 51 outputs the detection signal Sτ despite the fact that the sensor IC 50, 51 actually outputs the abnormality diagnosis signal Sd. In other words, when instantaneous interruption occurs in the feed line of the sensor IC 50, 51 and then electric power supply to the sensor IC 50, 51 is resumed, the sensor IC 50, 51 outputs the first signal S1 and the second signal S2 sequentially as the abnormality diagnosis signal Sd. At this stage, the output signal Sa of the sensor IC 50, 51 satisfies the relationship represented by the expression "Vmin≤Sa≤Vmax" in the period in which the sensor IC 50, 51 outputs the first signal S1 and the second signal S2. This may cause the microcomputer 41 to erroneously determine that the sensor IC 50, 51 outputs the detection signal Sτ. To solve this problem, it is desirable that the microcomputer 41 monitor whether the sensor IC 50, 51 outputs the detection signal lower limit value Vmin when, monitoring whether the sensor IC 50, 51 outputs the detection signal Sτ. When detecting that the sensor IC 50, 51 outputs the detection signal lower limit value Vmin, the microcomputer 41 may determine that the sensor IC 50, 51 does not output the detection signal Sτ.

In each of the illustrated embodiments, the microcomputer 41 performs the procedure of detecting an abnormality of the power source voltage of each sensor IC 50, 51 as the second abnormality detection procedure in the period in which the sensor IC 50, 51 outputs the detection signal Sτ. However, a similar procedure of detecting an abnormality of the power source voltage may be carried out in the period in which the sensor IC 50, 51 outputs the abnormality diagnosis signal Sd. Specifically, the power source voltage of the sensor IC 50, 51 is unstable in the period immediately after electric power supply to the sensor IC 50, 51 is resumed. Accordingly, if the procedure of detecting an abnormality of the power source voltage is performed in this period, erroneous abnormality detection may occur. To solve this problem, it is desirable that the microcomputer 41 execute the procedure of detecting an abnormality of the power source voltage after detecting that the sensor IC 50, 51 has output the detection signal lower limit value Vmin. In this manner, the procedure of detecting an abnormality of the power source voltage is carried out after the electric power supply to the sensor IC 50, 51 is reliably performed. Erroneous abnormality detection is thus avoided. If an abnormality of the power source voltage of the sensor IC 50, 51 is detected in the period in which the sensor IC 50, 51 outputs the abnormality diagnosis signal Sd, it is effective that the microcomputer 41 performs Step S14 and the subsequent steps represented in FIGS. 4 and 7.

In each of the illustrated embodiments, the torque value τ used as the hold value τh is detected immediately before output of the detection signal Sτ by each sensor IC 50, 51 is ended. However, the timing at which the torque value used as the hold value τh is detected may be changed to any other suitable timing. Alternatively, an average of multiple torque values τ detected in she period in which the sensor IC 50, 51 outputs the detection signal Sτ may be used as the hold value τh.

In each of the illustrated embodiments, the torque value τ used as the hold value τh is detected on condition that an output abnormality of the sensor ICs 50, 51 is not detected in the period from the point in time as which it is detected that the sensor IC 50, 51 outputs the detection signal Sτ to the point in time at which the predetermined time period T14 elapses. However, the torque value τ used as the hold value in may be detected at a point in time at which it is detected that the sensor IC 50, 51 outputs the detection signal Sτ, including the respective points in time t16, t23 represented in FIG. 5, for example.

In each of the illustrated embodiments, the hold value τh is returned to the previous hold value τhb before update if an output abnormality of the sensor IC 50, 51 is detected based on the abnormality diagnosis signal Sd and the detected output abnormality is an abnormality of the detection signal Sτ. However, this procedure may be omitted. In other words, Steps S12 and S13 of FIGS. 4 and 7 may be omitted.

In each of the illustrated embodiments, the driving of the motor 20 is controlled based on the hold value τh in the period in which the sensor IC 50, 51 outputs the abnormality diagnosis signal Sd and the detection signal Sτ. However, the driving of the motor 20 may be controlled based on the hold value τh only in the period in which the sensor IC 50, 51 outputs the abnormality diagnosis signal Sd. The driving of the motor 20 may be controlled based on the detection signal Sτ in the period in which the sensor IC 50, 51 outputs the detection signal Sτ.

In each of the illustrated embodiments, each sensor IC 50, 51 outputs the abnormality diagnosis signal Sd when electric power supply to the sensor IC 50, 51 is started. However, the sensor IC 50, 51 may output the abnormality diagnosis signal Sd in response to a command signal from the microcomputer 41, for example. Specifically, the command signal from the microcomputer 41 may be used as a trigger for causing the sensor IC 50, 51 to output the abnormality diagnosis signal Sd. In other words, any other suitable configuration may be employed as long as the sensor IC 50, 51 outputs the abnormality diagnosis signal Sd and the detection signal Sτ when receiving a specific trigger from an external device.

In each of the illustrated embodiments, the abnormality diagnosis signal Sd output from each sensor IC 50, 51 has the waveform illustrated in FIG. 3(b). However, the waveform, of the abnormality diagnosis signal Sd may be modified in any other suitable manner. For example, a waveform in which the second signal S2, the first signal S1, and the abnormality detection signal Se are sequentially output in this order may be employed as the abnormality diagnosis signal Sd. Alternatively, a waveform in which the abnormality diagnosis signal Sd, the first signal S1, and the abnormality detection signal Se are sequentially output or a waveform in which the second signal 32 and the abnormality detection signal Se are sequentially output may be used. If the sensor IC 50, 51 does not have the self-diagnosis function, the waveform of the third signal S3 may be omitted from the abnormality diagnosis signal Sd. Also, the waveform of the first signal S1 and the waveform of the second signal S2 may be omitted from the abnormality diagnosis signal Sd and only the third signal S3 may be used as the abnormality diagnosis signal Sd. Specifically, as long as the abnormality diagnosis signal. Sd is configured by a predetermined waveform and useful for determining whether there is an output abnormality of the sensor IC 50, 51, the abnormality diagnosis signal Sd may include any suitable signal other than the first to third signals S1 to S3.

In each of the illustrated embodiments, when the sensor ICs 50, 51 both operate normally, it is monitored whether each sensor IC 50, 51 operates normally through comparison between the detection signals Sτ of the sensor ICs 50, 51. If an abnormality of one of the sensor ICs 50, 51 is detected through the comparison between the detection signals Sτ of the sensor ICs 50, 51, the first abnormality detection procedure represented in FIG. 5 may be employed to identify the sensor IC having the abnormality. Specifically, when an abnormality of one of the sensor ICs 50, 51 is detected, the sensor IC having the abnormality is identified out of the sensor ICs 50, 51 by temporarily blocking and then resuming electric power supply to the sensor ICs 50, 51 and carrying out the procedure represented in FIG. 5. By this method, the sensor IC having the abnormality is easily identified out of the sensor ICs 50, 51.

In each of the illustrated embodiments, the torque sensor 5 includes the two sensor ICs 50, 51. However, the torque sensor 5 may have a single sensor IC.

In each of the illustrated embodiments, the sensor ICs 50, 51 of the torque sensor 5 are illustrated as a sensor section for outputting a detection signal and an abnormality diagnosis signal. However, the sensor section for outputting a detection signal and an abnormality diagnosis signal is not restricted to the sensor ICs 50, 51. For example, a sensor IC of the rotation angle sensor 7 may be configured similarly with the sensor ICs 50, 51 of the illustrated embodiments such that a detection signal and an abnormality diagnosis signal are output from the sensor IC of the rotation angle sensor 7.

The present invention is not restricted to a motor control device of an electric power steering apparatus but may be employed in any other suitable motor control device. The motor control device in which the invention is employable may be any suitable motor control device as long as the motor control device includes a sensor for outputting a detection signal corresponding to a quantity of state of a detection subject and controls the driving of a motor based on the detection signal of the sensor.

The invention claimed is:

1. A motor control device, comprising:
a sensor device comprising a plurality of sensor sections, the plurality of sensor sections providing output to a microcomputer, wherein the microcomputer is configured to:
detect a quantity of state of a subject to be detected and output a detection signal corresponding to the detected quantity of state,
wherein when receiving a specific trigger transmitted from an external device, at least one of the plurality of sensor sections outputs an abnormality diagnosis signal, which is configured by a predetermined waveform and used for determining whether there is an output abnormality of the at least one sensor section, and then the at least one sensor section outputs the detection signal, wherein when one of the plurality of sensor sections has a failure, the microcomputer is configured to perform abnormality diagnosis detection by virtue of an other of the plurality of sensor sections outputting the abnormality diagnosis signal and the detection signal, and wherein a motor is driven based upon the output of the detection signal; and a control section configured to control the driving of a motor based on the detection signal output from the at least one sensor section of the sensor device, the control section comprising the microcomputer, wherein the control section causes the at least one sensor section to alternately output the abnormality diagnosis signal and the detection signal by periodically transmitting the trigger to the at least one sensor section, wherein the control section determines whether there is an output abnormality of the at least one sensor section based on the abnormality diagnosis signal, wherein the control section updates a hold value using the quantity of state obtained based on the detection signal each time the at least one sensor section outputs the detection signal, wherein the control section controls the driving of the motor based on the updated hold value in a period during which the at least one sensor section outputs the abnormality diagnosis signal, and when detecting an output abnormality of the at least one sensor section based on the abnormality diagnosis signal output from the at least one sensor section immediately after update of the hold value, the control section returns the hold value to the value before the update of the hold value.

2. The motor control device according to claim 1, wherein the abnormality diagnosis signal includes at least one of a waveform in which output at a level corresponding to a lower limit value of the detection signal continues for a predetermined time and a waveform in which output at a level corresponding to an upper limit value of the detection signal continues for a predetermined time.

3. The motor control device according to claim 1, wherein each of the plurality of sensor sections outputs an abnormality detection signal when detecting an abnormality through self-diagnosis, and the abnormality diagnosis signal includes a waveform in which output at a level corresponding to the abnormality detection signal continues for a predetermined time.

4. The motor control device according to claim 1, wherein the trigger is start of electric power supply to the at least one sensor section.

5. The motor control device according to claim 1, wherein the trigger is input of a specific command signal to the at least one sensor section.

6. The motor control device according to claim 1, wherein the control section returns the hold value to the value before the update of the hold value if a signal output from the at least one sensor section immediately after the control section obtains the quantity of state used as the hold value continues to be at a level lower than or equal to a predetermined threshold value for a predetermined time.

7. The motor control device according to claim 1, wherein the control section detects the quantity of state used as the hold value on condition that the output abnormality of the at least one sensor section is not detected in a period from a point in time at which it is detected that the sensor section outputs the detection signal to a point in time at which a predetermined time has elapsed.

8. An electric power steering apparatus comprising:
the motor for applying assist torque to a steering mechanism of a vehicle; and
the motor control device according to claim 1 for controlling driving of the motor,
wherein the sensor device of the motor control device is a torque sensor that detects steering torque applied to the steering mechanism.

* * * * *